United States Patent [19]
Rahn

[11] Patent Number: 4,838,476
[45] Date of Patent: Jun. 13, 1989

[54] VAPOUR PHASE TREATMENT PROCESS AND APPARATUS

[75] Inventor: Armin Rahn, St. Jean sur Richelieu, Canada

[73] Assignee: Fluocon Technologies Inc., Quebec, Canada

[21] Appl. No.: 119,567

[22] Filed: Nov. 12, 1987

[51] Int. Cl.⁴ .......................... B23K 1/12; H05K 3/34
[52] U.S. Cl. .................................. 228/180.1; 228/240; 228/221; 219/275; 432/13; 432/152; 134/107; 134/108
[58] Field of Search .......................... 432/13, 197, 152; 219/273, 275; 134/107, 104, 108; 34/68, 78, 34; 228/180.1, 240, 221

[56] References Cited

U.S. PATENT DOCUMENTS

| | | | |
|---|---|---|---|
| 3,025,533 | 3/1962 | Hair | 219/273 X |
| 4,077,467 | 3/1978 | Spigarelli | 134/107 X |
| 4,264,299 | 4/1981 | Ammann et al. | 432/13 |
| 4,321,031 | 3/1982 | Woodgate | 219/275 X |
| 4,392,049 | 7/1983 | Bentley et al. | 228/242 X |
| 4,676,069 | 6/1987 | Miyate | 228/180.1 |
| 4,747,218 | 5/1988 | Saint Martin | 432/197 |

Primary Examiner—Kenneth J. Ramsey
Attorney, Agent, or Firm—Charles E. Brown; Charles A. Brown

[57] ABSTRACT

A process for treating workpieces in a normally closed treatment chamber. The process comprises providing a pressure within the chamber which is less than atmospheric and providing an unsaturated treatment vapor within the chamber. A workpiece is then moved into the chamber to be treated by the unsaturated vapor. The process is particularly suited for the vapor phase soldering of printed circuit boards. The unsaturated vapor in the chamber is heated to a temperature higher than the melting point of the solder used and the circuit boards with solder thereon are passed through the vapor in the chamber to reflow the solder.

The invention is also directed toward an apparatus for carrying out the process.

24 Claims, 2 Drawing Sheets

VAPOUR PHASE TREATMENT PROCESS AND APPARATUS

BACKGROUND OF THE INVENTION

This invention relates to a process and apparatus for treating workpieces with a treating medium in the vapour phase. The invention, in one embodiment, is more specifically directed toward a process and apparatus for treating workpieces in a subatmospheric environment with a treating medium in the vapour phase. Preferably, the treating medium is in an unsaturated vapour phase. In another embodiment, the invention is more specifically directed toward a process and apparatus for treating workpieces with a treating medium in an unsaturated vapour phase.

The invention is particularly useful in the soldering of components to printed circuit boards and more specifically to reflowing pre-deposited solder cream to solder the components to the boards, and the invention will be described in connection with this usage. However the invention may also be used in connection with other applications such as, for example, the curing of thick film materials; the curing of epoxies; the melting of preforms; or the cleaning of printed circuit boards with solvents.

Reflow soldering has become an important way of soldering leadless, surface mounted components to printed circuit boards. Reflow soldering refers to the process of remelting solder cream deposited on the circuit board in order to achieve the solder connection between the metal traces of the printed circuit board and the leadless components which have been placed on top of the solder cream. The heat required to remelt the solder cream can be applied in various ways. One of the preferred ways is by vapour phase treatment of the printed circuit boards. In vapour phase treatment, the heat is provided by the latent heat of condensation given off by a vapour as it condenses. The vapour is formed by boiling a stable, generally inert liquid such as one of the fluorinated liquids. Examples of such liquids are perfluorotrianylamine (known under the tradename "FC-70" and sold by 3M) or perfluoropolyether (known under the tradename "Galden" and sold by Montedison/Montefluos. The liquid is boiled in a sump at the bottom of a treatment tank. The vapour produced by boiling the liquid has a clearly defined temperature which must be higher than the melting temperature of the solder. The vapour collects in the tank over the boiling liquid and the printed circuit board is passed into the tank, through the vapour, and out of the tank by suitable conveyor means. The temperature difference between the board which is usually at room temperature, and the vapour, which is at the boiling point of the liquid, causes the vapour to condense on the board, giving up heat as it does so which melts the solder. The heating of the solder is uniform and quick, usually taking between fifteen and forty-five seconds. The soldering process employing the vapour is called vapour phase soldering.

The liquids employed to provide the vapours are generally inert so as not to react with the materials in and on the circuit boards. They have a high enough boiling point to melt most solders used in the electronics industry. They are generally safe to work with and are stable. They are also expensive.

Processes at present used in vapour phase soldering are costly because some of the liquid used to produce the vapour is always being lost and must be replaced. Some of the liquid is lost through accidental spills, and by being captured in filters used on the apparatus. Some liquid is also lost by being carried out of the apparatus by the conveyor and the workpieces such as circuit boards. Most of the vapour that condenses on the circuit boards, and on the conveyor, drains off within the apparatus but some residue liquid remains on the circuit boards and the conveyor and is carried out of the apparatus. It is known to upwardly incline the conveyor toward the exit of the treatment tank to facilitate draining of the liquid. However the problem of losing liquid by the residue liquid being carried out of the apparatus on the circuit boards and conveyor remains.

Liquid is also lost from known apparatus by evaporation. As the liquid boils, the molecules gain kinetic energy and may escape from the liquid. These molecules may then escape from the tank through entrance and exit openings in the tank. The loss of liquid in this manner can be considerable. To try to prevent this loss, apparatus has been designed to provide a substantial distance between the surface of the boiling liquid and the entrance and exit openings. However, such apparatus is quite large. Apparatus has also been designed to employ condensing means within or adjacent the entrance and exit openings to cool and condense the escaping molecules and return them to the liquid. The condensing means are however expensive. Apparatus has also been designed to employ a less costly secondary liquid to produce a lighter, secondary vapour that overlies the primary vapour, blanketing it to prevent loss by evaporation. The use of a secondary vapour reduces the loss of the primary vapour. However the secondary vapour loss is still substantial. In addition, because the primary liquid has a higher boiling point than the secondary liquid, the secondary liquid tends to decompose at the interface between the liquids producing chemically active products which attack the printed circuit boards and also producing toxic products.

Liquid is also lost from known apparatus through aerosol formation. Some of the vapour condenses onto dust particles or ions within the treatment tank. These particles are not affected by any condensation means employed by the apparatus and can be carried out by the apparatus through the exit opening by convection currents. The convection currents can be formed by temperature differences, and aided by mechanical movement of the circuit boards and conveyor.

Another problem associated with known processes in vapour phase soldering is the time required for the actual soldering within the apparatus. The longer the soldering time required, the thicker the formation of the intermetallic layer in the solder joint, and therefore the weaker the joint. It is therefore desirable to keep the intermetallic layer as thin as possible, particularly when forming small solder joints, by speeding up the soldering process. This can be accomplished by using liquids with higher boiling points. However such liquids are more expensive making the operation more costly.

A further problem with known processes is the formation of hot spots on the heating surface used to boil the liquid. The localized hot spots can be caused by using improperly sized heaters or more commonly, by flux residues falling off the circuit boards and onto the heater surface and carbonizing. The hot spots can cause overheating of the liquid causing it to decompose and break down into chemically active and toxic products.

Specific heating means for boiling the liquid have been designed to try to avoid the hot spot problem. While successful, they add further to the cost of the machines.

SUMMARY OF THE INVENTION

It is the purpose of the present invention to provide improved vapour phase soldering processes, and apparatus for carrying out the processes. It is more specifically the purpose of the present invention to provide an improved vapour phase soldering process, and an apparatus for carrying out the process, that is less costly by way of substantially reducing the liquid losses. It is another more specific purpose of the present invention to provide an improved vapour phase soldering process, and an apparatus for carrying out the process, that can operate at a higher temperature to speed up the soldering process. It is a further specific purpose of the present invention to provide an improved vapour producing process in vapour phase soldering processes, including novel heating means for producing the vapour.

The improved process, in one embodiment, involves controlling the atmosphere within the apparatus to minimize vapour and liquid loss. In the present invention, the soldering process takes place within a normally closed treatment chamber. The entrance and exit openings to the treatment chamber are normally closed and the pressure within the treatment chamber is reduced to below atmospheric pressure. Thus any time the entrance or exit openings are opened to allow for movement of the circuit boards into or out of the chamber, atmosphere flow is into the chamber, rather than out of the chamber, due to the pressure differential. This prevents vapour and/or aerosol from escaping. At all other times the chamber is hermetically sealed. The atmosphere within the chamber is at least partly recirculated to control the pressure therein and to control the amount of treatment vapour in the chamber.

Preferably the apparatus of the present invention is provided with separate entrance and exit chambers adjacent the treatment chamber. The entrance and exit chambers act as air locks for the treatment chamber and each is provided with normally closed inlet and outlet openings allowing communication both with the atmosphere and with the treatment chamber. The pressure in each of the entrance and exit chambers is also controlled to have a value less than atmospheric and greater than the pressure in the treatment chamber. Thus atmospheric flow is always toward rather than away from the treatment chamber. The atmosphere in both entrance and exit chambers is also at least partly recirculated to control its pressure and to remove any vapour that may enter these chambers. The use of air locks and the pressure differentials permits larger entrance and exit openings to be used than now in use thus allowing larger circuit boards to be vapour phase soldered.

With the pressure in the exit chamber reduced from atmospheric pressure, carrying out of liquid on the circuit boards and conveyor from the apparatus is reduced. The circuit board which enters the exit chamber normally is at the solder melting/solidification temperature and is carrying some of the condensed vapour. To heat the board to evaporate the carried liquid, at atmospheric pressure, would delay the hardening of the solder and result in further growth of the intermetallic layer. However, by reducing the pressure in the exit chamber the boiling temperature of the liquid is lowered and the liquid on the workpiece will be more easily evaporated by the heat of the carrier board. The vapour is removed to recover the liquid during recirculation of the atmosphere.

The reduced pressure maintained in the treatment chamber also results in a lowering of the boiling point of the liquid. Since the liquids normally used to produce the vapour have an atmospheric boiling point just above the melting temperature of the solder, any lowering of their boiling point, due to reduced pressure, may extend the soldering time thus resulting in further unwanted intermetallic growth. This problem is overcome in the present invention by using an unsaturated vapour which can be heated above the boiling point of its liquid and by using novel heating means allowing specific control of the temperature of the unsaturated vapour. The use of unsaturated vapour permits its temperature to range from the boiling point of its liquid at the reduced pressure within the treatment chamber to a temperature just below which decomposition of the vapour begins. Also, by controlling the pressure within the treatment chamber, the boiling point of the liquid can also be precisely controlled. If the pressure is lowered in the chamber, so is the boiling point of the liquid and the temperature of the vapour. With lower than normal vapour temperatures, solders with lower melting temperatures than the eutectic tin/lead solder normally employed can be used safely.

While the use of unsaturated vapour makes vapour phase soldering at reduced pressures most effective it is to be understood that the present invention also contemplates, in another embodiment, vapour phase soldering using unsaturated vapour at atmospheric pressure. The use of the unsaturated vapour allows higher vapour temperatures to be used in the soldering operation thus shortening the soldering time and providing better joints. The advantage in shortening the soldering time may outweigh the disadvantage of working in the chamber at atmospheric pressure and losing some of the vapour from the chamber.

The means for producing the unsaturated vapour include novel heating means having a heavy, relatively thick, plate. The plate is mounted at the bottom of the treatment chamber and is heated by suitable radiation heaters located beneath the plate and separated therefrom by an air gap. The construction of the heating means avoids hot spots. The unsaturated vapour is produced by injecting liquid onto the surface of the heated plate to instantly vaporize it. The liquid could be preheated if desired. Additional vapour could be produced by injecting a spray of liquid into the hot vapour already produced. Thus no boiling sump is needed in the apparatus avoiding the production of saturated vapour which cannot be heated above the boiling point of the liquid in the sump. The vapour produced by instantaneous vapourization of liquid off the plate surface behaves like an ideal gas, and it can therefore be heated above the boiling point of the liquid producing it. This allows the treatment chamber to be operated at a reduced pressure which in turn helps minimize vapour losses. The means for producing the vapour, in allowing higher temperatures, also shortens the soldering time thus providing better joints since the growth of the intermetallic layer in the soldered joint is reduced.

The improved process and apparatus permits the use of inert gas in the atmosphere within the treatment chamber. The inert gas can be used to slow down the speed of heating up the workpiece. The inert gas also reduces decomposition of the vapour making the process safer.

Since no liquid sump is employed in applicant's apparatus, the liquid can be safely stored in a closed and possibly insulated, supply tank during non-operation of the apparatus. When the apparatus is to be used, the plate can be preheated and sufficient liquid injected onto the heated plate to produce the required amount of vapour necessary to remelt the solder. When the soldering operation is completed, the vapour remaining in the apparatus can be condensed by suitable condensing means, or by the general cooling of the heater means, and returned to storage.

The invention is particularly directed toward a process for treating workpieces in a normally closed treatment chamber which comprises: providing a pressure within the chamber which is less than atmospheric, providing an unsaturated treatment vapour within the chamber, and moving a workpiece into the chamber and through the vapour in the chamber to be treated by the unsaturated vapour.

The invention is more particularly directed toward a process for vapour phase soldering circuit boards in a normally closed treatment chamber comprising the steps of: providing a pressure within the chamber which is less than atmospheric to help retain the atmosphere within the chamber, providing an unsaturated vapour within the chamber to form part of the atmosphere therein, the vapour having a temperature higher than the melting point of the solder to be used, and passing circuit boards with solder thereon into the chamber and through the unsaturated vapour in the chamber to have it reflow the solder.

The invention is also directed toward an apparatus for treating workpieces with an unsaturated vapour which comprises an enclosure forming a normally closed treatment chamber; means for providing a pressure within the chamber which is less than atmospheric; means for providing an unsaturated vapour within the treatment chamber; and means for passing a workpiece into the chamber and through the vapour in the chamber.

The invention is further directed toward an apparatus for use in vapour phase soldering circuit boards comprising: an enclosure forming a normally closed treatment chamber; means for providing a pressure within the chamber which is less than atmospheric; means for providing an unsaturated vapour within the chamber having a temperature higher than the melting point of the solder to be used; and means for passing the circuit board through the vapour in the treatment chamber to reflow solder on the board.

The invention is further directed toward a process for treating workpieces which comprises: providing an unsaturated treatment vapour within the chamber, and moving a workpiece into the chamber and through the vapour in the chamber to be treated by the unsaturated vapour.

The invention is still further directed toward an apparatus for treating workpieces comprising: an enclosure forming a treatment chamber; means for providing an unsaturated vapour within the treatment chamber; and means for passing a workpiece into the chamber and through the vapour in the chamber.

DETAILED DESCRIPTION OF THE INVENTION

Figure 1:
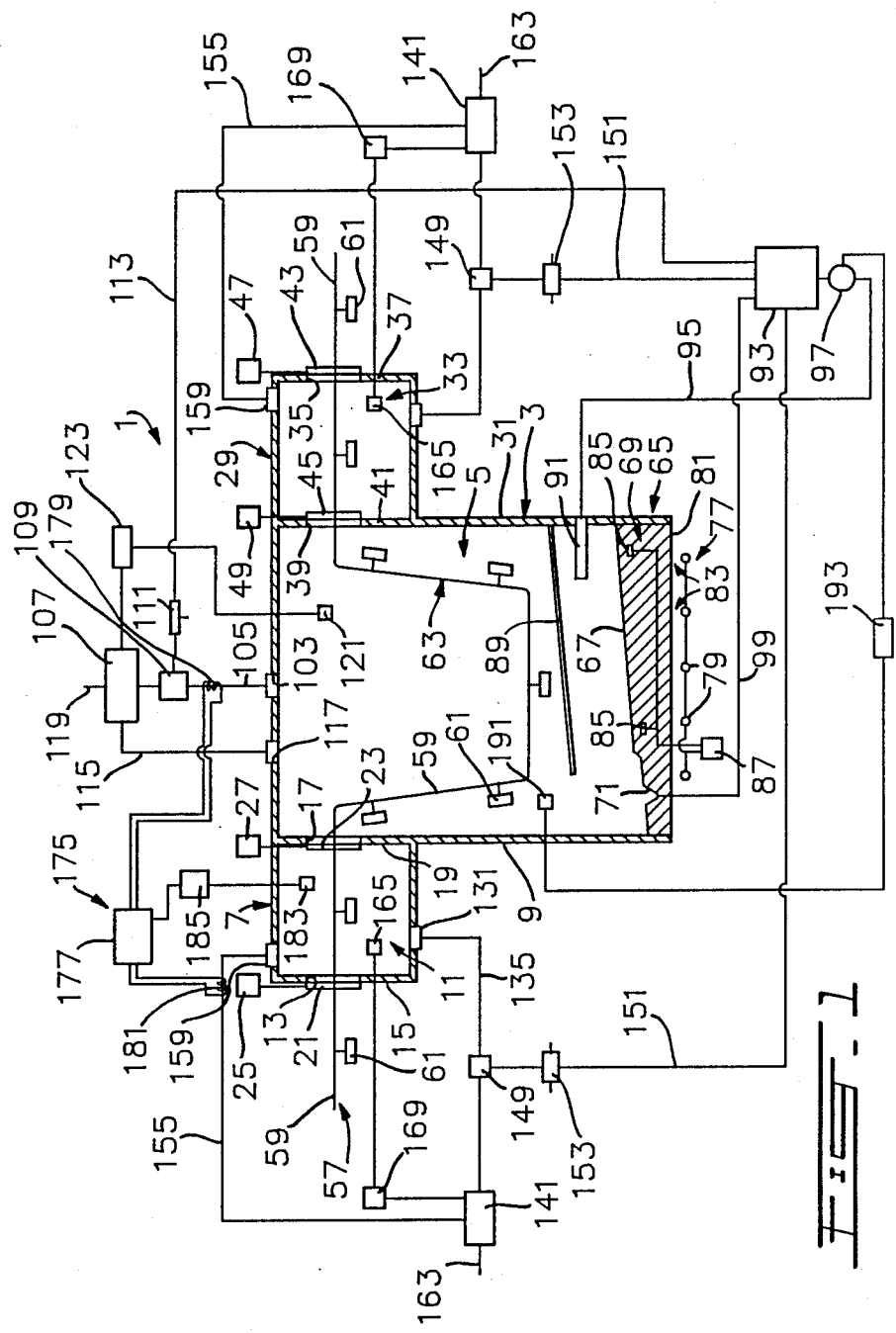
FIG. 1 is a schematic view of a preferred embodiment of the apparatus.

The apparatus 1 used in the vapour phase soldering of components to printed circuit boards, and more particularly in reflowing solder cream that has been predeposited onto the components and/or circuit board, has a major walled enclosure 3 defining a normally closed treatment chamber 5 therein. A first minor walled enclosure 7 is located on one side 9 of the major enclosure 3 defining a passage chamber 11 therein. The passage chamber 11 forms an entrance chamber. An opening 13 in one wall 15 of the first minor enclosure 7 provides access into the entrance chamber 11. An opening 17 in another wall 19 of the first minor enclosure 7, which wall is common with the major enclosure, connects the entrance chamber 11 to the treatment chamber 5. A movable door 21 normally closes opening 13 and another movable door 23 normally closes opening 17. Both doors 21, 23 in their closed position are air-tight. The entrance chamber 11 acts as an air-lock in providing access to the treatment chamber 5. To this end, when one of doors 21, 23 is open, the other is always closed. Suitable means 25, 27 are provided for moving each door 21, 23 respectively between its open and closed positions.

A second, minor walled enclosure 29 is located on the other side 31 of the major enclosure 3. The second minor enclosure 29 defines another passage chamber 33 therein. This passage chamber 33 forms an exit chamber. An opening 35 in one wall 37 of the second, minor enclosure provides access into the exit chamber 33. An opening 39 in another wall 41 of the second, minor enclosure, which wall is common with the major enclosure 3, provides access into the treatment chamber 5. A movable door 43 normally closes opening 35 and a movable door 45 normally closes opening 39. Both doors 43, 45 in their closed position are air-tight. As with the entrance chamber 11, an exit chamber 33 acts as an air-lock in providing access from the treatment chamber 5. When one of the doors 43, 45 is open, the other is always closed. Suitable means 47, 49 are provided for moving each door 43, 45 respectively between its open and closed position.

Conveyor means 57 are provided for moving the printed circuit boards, with their temporarily attached components and predeposited solder cream, through the entrance chamber 11, the treatment chamber 5 and the exit chamber 33, in sequence. The conveyor means 57 can be any well known endless-chain type conveyor 59 carrying the circuit boards 61 thereon in spaced-apart relation. The conveyor 59 is moved either continuously or intermittently through the chambers allowing at least one operation to be performed on the carrier boards while in the treatment chamber 5, and also, if desired, allowing operations to be performed on the carrier boards while in the entrance and exit chambers 11, 33. The doors 21, 23 and 43, 45 are provided with means for sealingly accomodating the conveyor when the doors are closed as is well known. The conveyor 59 preferably has an upwardly inclined run 63 on leaving the treatment chamber 5 to allow for drainage of liquid off the conveyor and the circuit boards.

Means are provided within the treatment chamber 5 for producing an unsaturated vapour in the chamber. The vapour producing means includes a heating member 65 located at the bottom of the treatment chamber 5 that is adapted to be heated to a temperature sufficiently high enough to instantly vaporize any treating liquid that falls on its upper surface 67. The heating member 65 can comprise a heavy, thick plate 69 made from suitable heat conducting material such as cast metal, a thick sheet of metal, or a stone slab. The heating plate 69 is detachably mounted at the bottom of major enclosure 3, sealing the bottom of treatment chamber 5. The upper surface 67 is preferably inclined, as shown and slopes down to a collecting trough 71 on one side of the plate. The trough 71 collects any excess liquid draining off the upper surface 67 for recirculation. The plate 69 can be easily removed for cleaning. Some metals used in making the plate 69 can contribute to the deterioration of the treating liquid. Also, some of the cast metals used in making the plate result in a somewhat porous structure. In these cases it is preferred to coat the upper surface 67 of the plate with a suitable protective layer made from ceramic, porcelain or other suitable material.

Heating means 77 are provided for heating the plate 69. The heating means 77 can comprise ceramic radiation heaters 79 located outside of the bottom of the major enclosure 3 but closely adjacent to the bottom 81 of the plate 69. An air gap 83 is provided between the heaters 79 and plate 69. Temperature sensors 85 can be located in plate 69 close to its upper surface 67. The temperature sensors 85 control the heaters 79, via a controller 87 to heat the upper surface 67 of the plate 69 to a precise temperature. A protective screen 89 may be mounted within the enclosure 3 above the plate 69 to shield it from accidental drips of flux from the circuit boards being conveyed through the enclosure. If necessary, a rinsing system (not shown) could also be provided above the plate 69 within the enclosure 3 to keep the upper surface 67 of the plate clean to prevent contamination of the treating liquid. The rinsing system could employ cleaning fluids chemically related to the treating liquid families, such as fluorocarbons. Acetone could also be used.

The vapour producing means includes a liquid injector 91 within the treatment chamber 5 located above plate 69 and beneath screen 87. The injector 91 injects liquid onto the hot upper surface 67 of the plate 69 to produce unsaturated vapour. The liquid may be injected as a stream, as drops, or as a spray. The liquid is fed to the injector 91 from a supply source 93 via a line 95 under suitable pressure, such as that provided by a pump 97. Excess liquid from trough 71 is returned to source 93 via line 99.

The liquid employed to produce the vapour is a fluorinated liquid such as perfluorotrianylamine (sold under the tradename "FC-70" by "3M") although other liquids such as perfluoropolyether (sold under the tradename "Galden" by "Montedison/Montefluos") or perfluoroperhydrophenantrene (sold under the tradename "Flutec PP11" by "ISC Chemicals") can be employed.

Means are provided for controlling the pressure of the atmosphere within the treatment chamber 5. These means comprise an atmosphere outlet 103 in the major enclosure 3 leading from the treatment chamber 5, via a duct 105, to a vacuum pump 107. Condensor means 109 can be located in the duct 105 for condensing the treatment vapour from the atmosphere drawn from the treatment chamber to maintain a desired amount of vapor in the atmosphere. The recovered liquid from condensor means 109 is filtered by filter means 111 and then returned for recycling to the liquid supply source 93 via a line 113. At least some of the remaining atmosphere can be returned to the treatment chamber 5 from the vacuum pump 107 via a return line 115 and a return opening 117 in the main enclosure 3. The remainder of the atmosphere, essentially air, is exhausted through exhaust line 119. Sensing means 121 within the treatment chamber 5, via control means 123 operate the vacuum pump 107 to maintain the pressure within the chamber at a desired value which is less than the pressure maintained in the entrance and exit chambers 11 and 33, and less than atmospheric pressure.

Means are provided for controlling the pressure of the atmosphere in both the entrance chamber 11 and the exit chamber 33. These means are similar to the atmosphere controlling means employed with the treatment chamber 5 and since both are identical only one will be described in detail. The atmosphere controller for the entrance chamber 11 has an atmosphere outlet 131 in the enclosure 7 connected to a duct 135. The duct 135 leads to another vacuum pump 141. As before, condensor means 149 can be provided in duct 135 to condense the treatment vapour from the atmosphere and collect it and return it, via line 151 and filter means 153 to the supply source 93. Some of the remaining atmosphere is returned from the vacuum pump 141 to the chamber 11 via return duct 155 and return opening 159. The remaining atmosphere, essentially air, is exhausted via exhaust line 163. A sensor 165 in the chamber 11, via a controller 169, controls operation of the vacuum pump 141 to normally maintain a pressure within the chamber 11 which is greater than the pressure within the treatment chamber 5 but less than atmospheric pressure.

Preferably, means are provided for heating the atmosphere in duct 155 returning to the entrance chamber 11. The heating means 175 can comprise a heat pump 177 having a coil 179 wrapped about the atmosphere duct 105 leading from the major enclosure 3. Heat picked up by fluid circulating in this coil 179 is transferred in the heat pump 177 to a fluid circulating in coil 181 wrapped about return duct 155. A temperature sensor 183 in the entrance chamber 11 controls the heat pump 177, via a controller 185 to heat the atmosphere in the entrance chamber 11 to a desired temperature. The heated atmosphere is used to preheat the conveyor 59 and the circuit boards 61 prior to their entry into the treatment chamber 5. No similar heating means are normally necessary for the atmosphere in exit chamber 33 but if needed they can easily be provided.

In operation, the printed circuit boards 61 on which assembled components to be soldered to the boards are mounted, are coated with a solder cream and mounted on the endless conveyor 59 outside of apparatus 1. The conveyor 59 carries the boards 61 into the entrance chamber 11 through opening 13 when door 21 is open. When door 21 is open, door 23 is closed, closing opening 17 into the treatment chamber 5. When the apparatus 1 is operating, a reduced pressure, less than atmospheric, is being maintained in the entrance chamber 1 by vacuum pump 14. As a result, when door 21 is opened, the atmospheric flow is into the chamber 11 rather than out of it. Once at least one board 61 is moved into chamber 11 by conveyor 59, door 21 is closed. With both doors 21, 23 now closed the returning atmosphere from duct 155 can be heated, if desired, to preheat the conveyor section and the one or more boards 61 in chamber 11.

After sufficient preheating, door 23 is opened, while door 21 remains closed, and the preheated boards 61 are moved into the treatment chamber 5 through opening 17. The main chamber 5 is maintained by vacuum pump 107 at a pressure that is less than the pressure maintained in entrance chamber 11. Thus atmosphere flows from entrance chamber 11 to treatment chamber 5 when door 23 is opened.

Prior to moving the preheated boards 61 into treatment chamber 5, an unsaturated treatment vapour has been provided in treatment chamber 5. The vapour has been provided by injecting a fluorine based liquid, by way of example, in the form of a spray, from injector 91 onto the hot surface 67 of heated plate 69. The liquid vaporizes instantly on contacting the surface 67, producing unsaturated vapour. The unsaturated vapour, acting as a perfect gas, can be heated to a temperature higher than the boiling point of the liquid. The temperature of the unsaturated vapour can be controlled by the surface temperature of the plate 69. It will be apparent that with the pressure within the chamber 5 lowered to prevent loss of vapour from the chamber, the boiling temperature of the liquid is also lowered. This would adversely affect the reflowing of the solder on the boards. However since the vapour can be heated to a temperature higher than the boiling point of the liquid, the chamber can be operated at a pressure lower than atmospheric thus ensuring that little or no vapour will be lost from treatment chamber 5.

The unsaturated vapour condenses on the boards entering the chamber giving up latent heat of condensation which heat is used to melt or "reflow" the solder cream thereby soldering the components to the circuit board. To speed up the soldering step, the boards may be preheated in the entrance chamber 11 as previously described. The condensed liquid, dropping off the circuit boards and conveyor, particularly when the boards are on the inclined section 63 of the conveyor can be collected on the screen 89 which protects the surface 67 of the plate 69. The screen 89 directs the liquid to collector 71 which leads to tank 93 via line 99. As much liquid is injected onto the plate 67 as is needed to provide the necessary amount of unsaturated vapour to reflow the solder. At least one vapour sensor 191 can be provided in the chamber 5 to sense the amount of vapour therein. A controller 193, operated by sensor 191 controls operation of pump 97 to control the amount of vapour.

Once the solder reflow operation is completed, the circuit boards 61 are moved out of the treatment chamber 5 into the exit chamber 33, through opening 39. When door 45 is opened, the atmospheric flow will be from the exit chamber 33 into the treatment chamber 5 because of the pressure differential between the chambers. This again minimizes the loss of vapour. Once the circuit board or boards are within the exit chamber 33, the door 45 is closed. If desired, the pressure within the chamber 33 can now be lowered by increasing the output of the vacuum pump 141 associated with this chamber via controller 169. The lowered pressure within the chamber 33 helps boil off residue liquid on the still hot circuit boards and conveyor without affecting the soldered joints. The vapour formed in the chamber 33 can be collected by condensor 149 and returned to tank 93. Under certain conditions, the atmosphere within the chamber 33 could even be heated at the lowered pressure to assist in recovery of the vapour without affecting the soldered joints.

Once residue liquid has been recovered, the pressure within chamber 33 can be raised to a level above that in chamber 5 and below atmospheric and door 43 is opened while door 45 remains closed. The soldered circuit boards are then moved out of chamber 33 through opening 35 by conveyor 59. Because of the pressure differential, atmospheric flow is into chamber 33 rather than out of it.

When it is necessary to shut down the apparatus, all of the vapour in the atmospheres in the three chambers can be condensed by the condensing means 109, 149 and/or by a general cooling of the heater means and returned to tank 93 for storage. When the apparatus is to be started up an initial quantity of liquid is injected onto the plate 69 from injector 91 to build up the vapour to the desired level.

If desired, inert gas such as nitrogen or carbon dioxide can be used in the treatment chamber 5 to provide, with the unsaturated vapour, the atmosphere within the chamber. The inert gas can be used to control the concentration of the vapour within the chamber which in turn can control the rate or speed at which the circuit boards are heated up. While normally it is preferred to heat the circuit boards up to reflow temperature as quickly as possible, there may be situations in which a slower heat up is desirable. For example, quick heat up is thought to lead to a higher incidence of soldering defects known as "tomb-stoning". "Tomb-stoning" describes chip components soldered on one side only with the unsoldered side raised up from the base. Quick heat up can also contribute to "thermal shock" which can damage sensitive components. Thus a slower heat up of the circuit boards can minimize the "tomb-stoning" effect and thermal shock. The use of inert gas also makes the process safer since there is less decomposition of the vapour in the presence of the inert gas than in the presence of air.

While the apparatus has been described as having single doors 21, 23, 43, 45 at the openings 13, 17 and 35, 39 in chambers 7 and 29, double doors, operated independently, could be used at each opening. Further, while the preferred apparatus has been described with entrance and exit chambers, it is obvious that the apparatus could be constructed and operated without the entrance and exit chambers and still provide improved performance over known vapour phase soldering apparatus.

Figure 2:
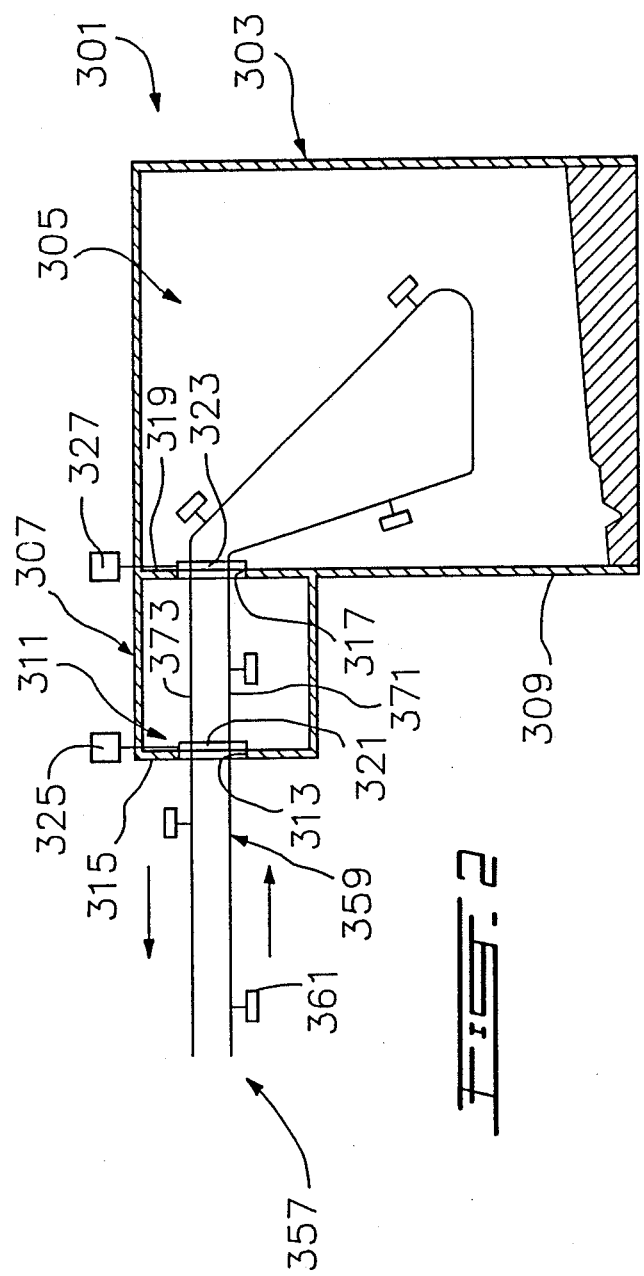
FIG. 2 is a schematic view of another embodiment of the apparatus.

In another embodiment of the invention, the apparatus could be provided with a treatment chamber and a single passage chamber which serves as both entrance and exit chamber. As shown in FIG. 2, the apparatus 301 has a major walled enclosure 303 defining a normally closed treatment chamber 305 therein. A minor walled enclosure 307 is located on one side 309 of the major enclosure 303, defining a passage chamber 311. An opening 313 in one wall 315 of the minor enclosure 307 provides access to and from passage chamber 311. An opening 317 in another wall 319 of enclosure 307, which wall is common with the major enclosure 303 provides communication with the major enclosure 303. A movable door 321 normally closes opening 313 and a movable door 323 normally closes opening 317. Suitable means 325 and 327 are provided for moving the doors 321, 323 respectively to open or close openings 313, 317. The doors 321, 323 are airtight when closed.

Conveying means 357 move printed circuit boards with their temporarily attached components and pre-deposited solder cream through passage chamber 311, into treatment chamber 305, back into passage chamber 311 and out. The conveying means 357 can comprise an endless chain type conveyor 359 carrying circuit boards 361 at spaced apart locations. The conveyor 359 passes through opening 313 into passage chamber 311, through opening 317 into treatment chamber 305, through unsaturated vapour in treatment chamber 305, back through opening 317 into passage chamber 311 and out through opening 313.

Passage chamber 311 acts as an air lock for treatment chamber 305. The pressure of the atmosphere in chamber 305 is maintained less than the pressure of the atmosphere in passage chamber 311 which in turn is maintained less than atmospheric pressure. The pressure control means are similar to those employed in the apparatus shown in FIG. 1. The pressure control means ensure that flow is always into treatment chamber 305 thereby minimizing vapour loss. Unsaturated vapour is generated in treatment chamber 305 in the same manner as before to solder components to the boards.

Preferably the boards 361 are spaced on conveyor 359 in a manner to have only one board 361 in the passage chamber 311 at a time. The board 361 in the passage chamber 311 alternates between one from the entrance run 371 of the conveyor 359 and one from the exit run 373 of the conveyor 359. Thus the passage chamber 311 can be used to preheat the boards on the entrance run 371 and to more thoroughly remove condensed vapour from the boards on the exit run 373. Passage chamber 311 is alternatively heated, and subjected to a reduced pressure. The heating and pressure control means for passage chamber 311 are similar to those employed for the entrance and exit chambers in the apparatus shown in FIG. 1.

While the apparatus 301 has both the entrance and exit conveyor runs 371, 373 using the same doors 313, 317, separate doors could be provided for each run.

Both apparatus embodiments employ an endless conveyor travelling through the apparatus. It is obvious however than an inside endless conveyor can be employed within the machine with transfer means associated with the entrance and exit chambers, or the passage chamber, to transfer articles to and from the endless conveyor.

The apparatus employed, in another embodiment, could employ a treatment chamber that operates at atmospheric pressure. In this embodiment, it will be accepted that some vapour is lost from the treatment chamber during its operation, particularly when circuit boards are being transferred in and out of the chamber. However, the advantages of using unsaturated vapour and thus being able to heat the circuit boards more quickly due to the higher temperatures to which the unsaturated vapour can be heated outweigh the disadvantage of losing some of the vapour.

The apparatus 1 shown in FIG. 1 can be modified to have its treatment chamber 5 operate at atmospheric pressure merely by shutting off the vacuum pump 107 via its control means 123. The movable doors 21, 23 and 43, 45 in the entrance and exit chambers 11, 33 respectively minimize vapour loss from the treatment chamber 5 as do the atmosphere control means in the entrance and exit chambers 11, 33. Much of the vapour lost from the treatment chamber 5 can be collected by running the atmosphere control means in the entrance and exit chambers 11, 33 at a slightly reduced pressure.

If desired other types of known vapour loss minimizing means can be employed in the modified apparatus. For example, the treatment chamber 5 could be provided with means for generating a cheap, secondary vapour within the treatment chamber to blanket the more expensive unsaturated vapour therein. Any vapour lost from the chamber would be primarily the cheaper secondary vapour. Alternatively, vapour condensing means could be provided within the entrance and exit chambers 11, 33 adjacent either or both of the openings 13, 17 and 35, 39 in the chambers 11, 33 respectively.

I claim:

1. A process for the vapour phase soldering of circuit boards in a normally closed apparatus having a treatment chamber and a passage chamber which comprises: maintaining a pressure within the passage chamber which is less than atmospheric to help retain the atmosphere therein when it is opened to the atmosphere; maintaining a pressure in the treatment chamber which is less than the pressure in the passage chamber to help retain the atmosphere therein when it is opened to the passage chamber; generating an unsaturated treatment vapour within the treatment chamber by vapourizing a liquid therein to form part of the atmosphere therein; heating the unsaturated treatment vapour within the treatment chamber to a desired temperature above the boiling point of the liquid, the vapour having a temperature higher than the melting point of the solder being used; and moving circuit boards with solder thereon into the passage chamber and then into the treatment chamber and through the heated, unsaturated vapour therein to have the vapour reflow the solder.

2. A process for treating workpieces in a normally closed apparatus having a treatment chamber and an adjacent passage chamber which comprises: maintaining a pressure within the passage chamber which is less than atmospheric so as to cause atmosphere to flow into the passage chamber when it is opened to the atmosphere; maintaining a pressure within the treatment chamber which is less than the pressure within the passage chamber so as to cause atmosphere to flow into the treatment chamber when it is opened to the passage chamber; generating an unsaturated treatment vapour within the treatment chamber by vapourizing a liquid within the treatment chamber; heating the unsaturated treatment vapour within the treatment chamber to a desired temperature above the boiling point of the liquid; and moving the workpiece into the passage chamber and then into the treatment chamber and through the heated, unsaturated vapour in the treatment chamber to be treated by the vapour.

3. A process as claimed in claim 2 and 1 including the step of heating the atmosphere in the passage chamber.

4. A process for treating workpieces in an apparatus having a normally closed treatment chamber and adjacent, normally closed entrance and exit chambers which comprises: maintaining a pressure within the entrance and exit chambers which is less than the atmospheric so as to cause atmosphere to flow into the chambers when they are opened to the atmosphere; maintaining a pressure within the treatment chamber which is less than the pressure within the entrance and exit chambers so as to cause atmosphere to flow into the treatment chamber when it is opened to the entrance or exit chambers; generating an unsaturated treatment vapour within the treatment chamber by vapourizing a liquid within the treatment chamber; heating the unsaturated treatment vapour within the treatment chamber to a desired temperature above the boiling point of the liquid; and moving a workpiece into the entrance chamber; into the treatment chamber and through the heated, unsaturated vapour in the treatment chamber to be treated by the vapour; into the exit chamber; and out of the exit chamber, in sequence.

5. A process for the vapour phase soldering of circuit boards in a normally closed treatment chamber which comprises: maintaining a pressure within the treatment chamber which is less than atmospheric to help retain the atmosphere within the chamber when it is opened to the atmosphere; generating an unsaturated vapour within the treatment chamber by vapourizing a liquid therein to form part of the atmosphere therein; heating the unsaturated treatment vapour within the treatment chamber to a desired temperature above the boiling point of the liquid, the vapour having a temperature higher than the melting point of the solder being used; and moving circuit boards with solder thereon into the chamber and through the heated, unsaturated vapour in the chamber to have the vapour reflow the solder.

6. A process for treating workpieces in a normally closed treatment chamber which comprises: maintainin a pressure within the treatment chamber which is less than atmospheric so as to cause atmosphere to flow into the treatment chamber when it is opened to the atmosphere; generating an unsaturated treatment vapour within the treatment chamber by vapourizing a liquid within the treatment chamber; heating the unsaturated treatment vapour within the treatment chamber to a desired temperature above the boiling point of the liquid; and moving a workpiece into the chamber and through the heated, unsaturated vapour in the chamber to be treated by the vapour.

7. A process for the vapour phase soldering of circuit boards in an apparatus having a normally closed treatment chamber and adjacent, normally closed entrance and exit chambers which comprises: maintaining a pressure within the entrance and exit chambers which is less than atmospheric to help retain the atmosphere therein when they are opened to the atmosphere; maintaining a pressure within the treatment chamber which is less than the pressure within the entrance and exit chambers to help retain the atmosphere therein when it is opened to the entrance or exit chambers; generating an unsaturated vapour within the treatment chamber by vapourizing a liquid therein to form part of the atmosphere therein; heating the unsaturated treatment vapour within the treatment chamber to a desired temperature above the boiling point of the liquid, the vapour having a temperature higher than the melting point of the solder being used; and moving circuit boards with solder thereon, in sequence, into the entrance chamber, into the treatment chamber and through the heated, unsaturated vapour in the treatment chamber to have the vapour reflow solder, into the exit chamber, and out of the exit chamber.

8. A process as claimed in claim 7 including the step of heating the atmosphere in the entrance chamber to preheat the circuit boards while they are in the entrance chamber.

9. A process as claimed in claim 7 including the step of reducing the pressure in the exit chamber below the pressure normally therein to assist in removing condensate from the circuit boards.

10. A process as claimed in claims 4 or 7 including providing an inert gas in the treatment chamber to form part of the atmosphere therein.

11. A process as claimed in claims 4 or 7 including the step of recirculating the atmosphere from the treatment chamber to control the amount of unsaturated treatment vapour therein.

12. A process as claimed in claims 4 or 7 including the step of recycling and processing the atmosphere from each of the entrance and exit chambers to recapture any vapour escaping from the treatment chamber.

13. A process as claimed in claims 1, 2 or 4 including the step of controlling the pressure within the treatment chamber to provide a desired pressure below atmospheric pressure; and moving the workpiece into the treatment chamber while the heated, unsaturated vapour is already in the treatment chamber.

14. A process as claimed in claims 5, 1 or 7 including the step of controlling the pressure within the treatment chamber to provide a desired pressure below atmospheric pressure; and moving the workpiece into the treatment chamber while the heated, unsaturated vapour is already in the treatment chamber.

15. An apparatus for treating workpieces with an unsaturated vapour comprising: an enclosure forming a normally closed treatment chamber; means for providing a pressure within the chamber which is less than atmospheric so as to cause atmosphere to flow into the chamber when it is opened to the atmosphere; means for introducing a liquid into the treatment chamber; heater means in the treatment chamber for vapourizing all the liquid to generate an unsaturated vapour within the treatment chamber; the heater means located at the bottom of the treatment chamber; means for controlling the heater to heat the unsaturated vapour in the treatment chamber to a desired temperature above the boiling temperature above the boiling temperature of the liquid; and means for passing a workpiece into the chamber and through the heated, unsaturated vapour in the chamber.

16. An apparatus for treating workpieces with an unsaturated vapour comprising: an enclosure forming a normally closed treatment chamber; an enclosure forming a normally closed passage chamber adjacent the treatment chamber; means providing selective communication between the treatment and passage chambers and between the passage chamber and the atmosphere; means providing a pressure within the passage chamber which is less than atmospheric so as to cause atmosphere to flow into the passage chamber when it is in communication with the atmosphere; means providing a pressure within the treatment chamber which is less than the pressure within the passage chamber so as to cause atmosphere to flow into the treatment chamber when it is in communication with the passage chamber; means for introducing a liquid into the treatment chamber; heater means in the treatment chamber for vapourizing all the liquid to generate an unsaturated vapour within the treatment chamber; the heater means located at the bottom of the treatment chamber; means for controlling the heater to heat the unsaturated vapour in the treatment chamber to a desired temperature above the boiling temperature of the liquid; and means for passing a workpiece through the passage chamber, into the treatment chamber, and through the heated unsaturated vapour in the treatment chamber.

17. An apparatus for treating workpieces with an unsaturated vapour comprising: a major enclosure forming a normally closed treatment chamber; a first minor enclosure forming a normally closed entrance chamber; a second minor enclosure forming a normally closed exit chamber; means providing selective communication between the entrance and treatment chambers and between the entrance chamber and the atmosphere; means providing selective communication between the exit and treatment chambers and between the exit chamber and the atmosphere; means providing a pressure in the exit and entrance chambers which is less than atmospheric so as to cause atmosphere to flow into them when they are in communication with the atmosphere; means providing a pressure within the treatment chamber which is less than the pressure within the entrance and exit chambers so as to cause atmosphere to flow into the treatment chamber when it is in communication with the entrance or exit chambers; means for introducing a liquid into the treatment chamber; heater means in the treatment chamber for vapourizing all the liquid to generate an unsaturated vapour within the treatment chamber; the heater means located at the bottom of the treatment chamber; means for controlling the heater to heat the unsaturated vapour in the treatment chamber to a desired temperature above the boiling temperature of the liquid; and means for passing a workpiece, in sequence, into the entrance chamber, into the treatment chamber and through the heated, unsaturated vapour therein, into the exit chamber, and into the atmosphere.

18. An apparatus for the vapour phase soldering of circuit boards comprising: an enclosure forming a normally closed treatment chamber; means for providing a pressure within the chamber which is less than atmospheric so as to cause atmosphere to flow into the chamber when it is open to the atmosphere; means for introducing a liquid into the treatment chamber; heater means in the treatment chamber for vapourizing all the liquid to generate an unsaturated vapour within the treatment chamber; the heater means located at the bottom of the treatment chamber; means for controlling the heater to heat the unsaturated vapour in the treatment chamber to a desired temperature above the boiling temperature chamber to a desired temperature above the boiling temperature of the liquid, the vapour having a temperature at least greater than the melting point of the solder being used on the circuit boards; and means for moving circuit boards with solder thereon into the treatment chamber and through the heated unsaturated vapour in the chamber to have the vapour reflow the solder.

19. An apparatus for the vapour phase soldering of circuit boards comprising: an enclosure forming a normally closed treatment chamber; an enclosure forming a normally closed passage chamber adjacent the treatment chamber; means providing selective communication between the treatment and passage chambers and between the passage chamber and the atmosphere; means providing a pressure within the passage chamber which is less than atmospheric so as to cause atmosphere to flow into the passage chamber when it is in communication with the atmosphere; means providing a pressure within the treatment chamber which is less than the pressure in the passage chamber so as to cause atmosphere to flow into the treatment chamber when it is in communication with the passage chamber; means for introducing a liquid into the treatment chamber; heater means in the treatment chamber for vapourizing all the liquid to generate an unsaturated vapour within the treatment chamber; the heater means located at the bottom of the treatment chamber; means for controlling the heater to heat the unsaturated vapour in the treatment chamber to a desired temperature above the boiling temperature of the liquid; the vapour having a temperature greater than the melting point of the solder being used on the circuit boards; and means for moving circuit boards with solder thereon into the passage chamber; then into the treatment chamber and through the heated, unsaturated vapour therein to have it reflow the solder; then back into the passage chamber and out to the atmosphere.

20. An apparatus for the vapour phase soldering of circuit boards comprising: a major enclosure forming a normally closed treatment chamber; a first minor enclosure forming a normally closed entrance chamber adjacent the treatment chamber; a second minor enclosure forming a normally closed exit chamber adjacent the treatment chamber; means providing selective communication between the entrance and treatment chambers and between the entrance chamber and the atmosphere; means providing selective communication between the exit and treatment chambers and between the exit chamber and the atmosphere; means providing a pressure within the exit and entrance chambers which is less than atmospheric so as to cause atmosphere to flow into the entrance and exit chambers when they are in communication with the atmosphere; means providing a pressure within the treatment chamber which is less than the pressure within the entrance and exit chambers so as to cause atmosphere to flow into the treatment chamber when it is in communication with the entrance or exit chambers; means for introducing a liquid into the treatment chamber; heater means in the treatment chamber for vapourizing all the liquid to generate an unsaturated vapour within the treatment chamber; the heater means located at the bottom of the treatment chamber; means for controlling the heater to heat the unsaturated vapour in the treatment chamber to a desired temperature above the boiling temperature of the liquid; the vapour having a temperature greater than the melting temperature of the solder being used on the circuit boards; and means for moving the circuit boards with solder thereon, in sequence, into the entrance chamber; into the treatment chamber and into the heated, unsaturated vapour therein to have it reflow the solder; into the exit chamber; and back into the atmosphere.

21. An apparatus as claimed in claim 16 or 19 including means to heat the atmosphere in the passage chamber in order to preheat the workpieces/circuit boards passing from the passage chamber into the treatment chamber.

22. An apparatus as claimed in claims 17 or 20 including means to heat the atmosphere in the entrance chamber in order to preheat the workpieces/circuit boards passing from the entrance chamber into the treatment chamber.

23. An apparatus as claimed in claims 15, 16 or 17 wherein the heater means comprises a heavy, heat conducting plate located within the treatment chamber to instantly vaporize the liquid; the plate being heated by heaters located beneath the plate outside of the treatment chamber and spaced from the plate; and means for controlling the heaters to control the temperature of the top surface of the plate.

24. An apparatus as claimed in claims 18, 19 or 20 wherein the heater means comprises a heavy, heat conducting plate located within the treatment chamber to instantly vaporize the liquid; the plate being heated by heaters located beneath the plate outside of the treatment chamber and spaced from the plate; and means for controlling the heaters to control the temperature of the top surface of the plate.

* * * * *